United States Patent [19]

McFarland et al.

[11] Patent Number: 5,860,807
[45] Date of Patent: Jan. 19, 1999

[54] SYSTEM AND METHOD FOR FINITE ELEMENT SIMULATION OF HELICOPTER TURBULENCE

[75] Inventors: R. E. McFarland, Union City; Ken Dulsenberg, Roseville, both of Calif.

[73] Assignee: The United States of America as represented by the National Aeronautics and Space Administration, Washington, D.C.

[21] Appl. No.: 656,145

[22] Filed: Apr. 22, 1996

[51] Int. Cl.$^6$ ........................................................ G09B 9/42
[52] U.S. Cl. .................................................. 434/33; 434/29
[58] Field of Search ................................... 434/29–33, 35, 434/45, 41, 49, 51, 56, 57, 59; 244/6, 17.11, 26; 446/36

[56] References Cited

U.S. PATENT DOCUMENTS

| | | | |
|---|---|---|---|
| 2,486,488 | 11/1949 | Lukacs | 434/46 |
| 3,346,969 | 10/1967 | Marvin | 434/33 |
| 4,268,979 | 5/1981 | Minnich | 434/46 |
| 4,958,786 | 9/1990 | Ogawa et al. | 244/17.13 |
| 5,354,017 | 10/1994 | Levich | 244/130 |
| 5,375,794 | 12/1994 | Bleeg | 244/76 |

OTHER PUBLICATIONS

R.E.McFarland, "Simulation of Rotor Blade Element Turbulence," NASA Technical Memorandum 198862, Jan. 1995.

Costello, M. F., "A Theory for the Analysis of Rotorcraft Operating in Atmospheric Turbulence," Proceedings of the 46th Annual National Forum of the American Helicopter Society, Washington, D. C., May 1990, pp. 1003–1015.

Prasad, J. V. R., Riaz, J., Gaonkar, G. H., Yingyi, D., "Real Time Implementation Aspects of a Rotorcraft Turbulence Simulation Method," 49th Annual Forum of the American Helicopter Society, St. Louis, MO, May 1993, p. 459.

Dahl, H. J. and Faulkner, A. J., "Helicopter Simulation in Atmospheric Turbulence," Vertica, vol. 3, 1979, pp. 65–78.

Judd, M. and Newman, S. J., "An Analysis of Helicopter Rotor Response due to Gust and Turbulence," Vertica, vol. 1, 1977, pp. 179–188.

Dang, Y., G. Gaonkar, Prasad, J., Zhang, H., "Parallel Computing of Helicopter Response to Turbulence Toward Real–Time Implementation," 50th Annual Forum of the American Helicopter Society, Washington, D.C., vol. 2, May 1994, pp. 869–882.

Primary Examiner—Glenn E. Richman
Attorney, Agent, or Firm—Kathleen Dal Bon; Harry Lupuloff; John G. Mannix

[57] ABSTRACT

The present invention provides a turbulence model that has been developed for blade-element helicopter simulation. This model uses an innovative temporal and geometrical distribution algorithm that preserves the statistical characteristics of the turbulence spectra over the rotor disc, while providing velocity components in real time to each of five blade-element stations along each of four blades, for a total of twenty blade-element stations. The simulator system includes a software implementation of flight dynamics that adheres to the guidelines for turbulence set forth in military specifications. One of the features of the present simulator system is that it applies simulated turbulence to the rotor blades of the helicopter, rather than to its center of gravity. The simulator system accurately models the rotor penetration into a gust field. It includes time correlation between the front and rear of the main rotor, as well as between the side forces felt at the center of gravity and at the tail rotor. It also includes features for added realism, such as patchy turbulence and vertical gusts in to which the rotor disc penetrates. These features are realized by a unique real time implementation of the turbulence filters. The new simulator system uses two arrays one on either side of the main rotor to record the turbulence field and to produce time-correlation from the front to the rear of the rotor disc. The use of Gaussian Interpolation between the two arrays maintains the statistical properties of the turbulence across the rotor disc.

The present simulator system and method may be used in future and existing real-time helicopter simulations with minimal increase in computational workload.

20 Claims, 8 Drawing Sheets ns. With this
SYSTEM AND METHOD FOR FINITE ELEMENT SIMULATION OF HELICOPTER TURBULENCE

ORIGIN OF THE INVENTION

The invention described herein was made in the performance of work under a NASA contract and is subject to the provision of Section 305 of the National Aeronautics and Space Act of 1958, Public Law 85568 (72 Stat. 435; 42 U.S.C. 2457).

BACKGROUND OF THE INVENTION

1. Technical Field of the Invention

The present invention is generally directed at aircraft simulation systems. More specifically, this invention relates to a new system and method for creating turbulence, including progressive gust penetration by the rotor, for use in real-time piloted helicopter simulations.

2. Description of the Prior Art

The modern helicopter is no longer a vehicle used for simple missions where only its hovering capability is required. The helicopter, and rotorcraft in general, are increasingly faced with complex missions which push the aircraft to its design limits. One emerging requirement which challenges helicopters is stabilized flight through moderate or severe atmospheric turbulence to accomplish high workload mission tasks.

Rotorcraft, both civilian and military, now compete with many other forms of transportation and have often shown great reliability and productivity in mission performance. These rotorcraft may be required to perform missions such as hovering over, and landing on moving platforms in high turbulence conditions. In light of the dynamic flight conditions which are encountered routinely, it is essential to have the capability to accurately predict rotorcraft performance in a turbulent atmosphere.

It is therefore clear that there is a great and still unsatisfied need for real-time rotorcraft atmospheric turbulence models in flight simulators. One of the most common grievances that many pilots have is that while they do feel turbulence acting on the helicopter in the flight simulator, the motion is not similar to real atmospheric turbulence.

One of the most severe limitations of the current rotorcraft atmospheric turbulence models is the lack of understanding of the fundamental physics underlying the rotorcraft response to atmospheric turbulence, which is different from that of the fixed wing aircraft. There is a fundamental difference between the ways in which rotary wing aircraft, such as helicopters, and fixed wing aircraft, such as airplanes, experience atmospheric turbulence. The difference is primarily due to blade rotational velocity. Whereas a wing element of an airplane has pure translational motion as the airplane cuts through a turbulence field, a blade element of a helicopter has translational as well as rotational motion. In an airplane both the turbulence and the response to turbulence are stationary random processes which require conventional body-fixed sampling, By comparison, the turbulence as well as the response to turbulence in a helicopter are cyclostationary and require blade-fixed sampling.

The rotational velocity introduces appreciable spatial distribution of turbulence velocities over the rotor disc. For conventional helicopters operating at attitudes of 1000 feet or below, the rotational velocity effects are not negligible. Research efforts have been made to provide methods with an analytical basis to predict and simulate turbulence and response statistics. One such simulation method is based on representing turbulence sample functions in terms of multi-variable sinusoids with random phases and provides second-order statistics of covariances and spectral densities.

Another turbulence simulation method is described in Costello, M. F., "A Theory for the Analysis of Rotorcraft Operating in Atmospheric Turbulence," Proceedings of the 46th Annual National Forum of the American Helicopter Society, Washington, D. C., May 1990, pp. 1003–1015. This article describes turbulence over a rotor blade that is approximated by a series of radial shape functions. With this expansion, a stochastic state space model is formed where the system dynamics matrix and the control matrix are periodic with a period equal to the rotor rotational speed and input to the plant is generated by independent white noise sources.

The following articles reflect some of attempted methods for improving turbulence simulation models, all of which are incorporated herein by reference:

Howlett, J. J., "UH-60A Black Hawk Engineering Simulation Program: Vol. I -Mathematical Model," NASA CR-1 66309, Dec. 1981.

Prasad, J. V. R., Riaz, J., Gaonkar, G. H., Yingyi, D., "Real Time Implementation Aspects of a Rotorcraft Turbulence Simulation Method," 49th Annual Forum of the American Helicopter Society, St. Louis, Mo., May 1993, p. 459.

Dahl, H. J. and Faulkner, A. J., "Helicopter Simulation in Atmospheric Turbulence," Vertica, Vol.3, 1979, pp. 65–78.

Judd, M. and Newman, S. J., "An Analysis of Helicopter Rotor Response due to Gust and Turbulence," Vertica, Vol. 1, 1977, pp. 179188.

Dang, Y., G. Gaonkar, Prasad, J., Zhang, H., "Parallel Computing of Helicopter Response to Turbulence Toward Real-Time Implementation," 50th Annual Forum of the American Helicopter Society, Washington, D.C., Vol. 2, May 1994, pp. 869–882.

However, the foregoing conventional methods have not proven to be totally satisfactory in real-time simulations since they either take excessive execution time or they do not yield realistic turbulence according to pilot opinion.

SUMMARY OF THE INVENTION

The present invention provides a unique simulator system and method for use in future and existing real-time helicopter simulations with minimal increase in computational workload.

The present invention further provides a turbulence model developed for blade-element helicopter simulation. This model uses an innovative temporal and geometrical distribution algorithm that preserves the statistical characteristics of the turbulence spectra over the rotor disc, while providing velocity components in real time to each of five blade-element stations along each of four blades, for a total of twenty blade-element stations.

An initial investigation of the simulator system was performed using a piloted, motion-based simulation of the Sikorsky UH60A Black Hawk helicopter. Although only the vertical component of stochastic turbulence was used in this initial investigation, vertical turbulence components induced vehicle responses in all translational and rotational degrees of freedom of the helicopter.

The single-degree-of-freedom configuration of the present simulator system was compared to a conventional full 6-degrees-of-freedom baseline configuration, where translational velocity inputs are superimposed at the vehicle center of gravity, and rotational velocity inputs are created from filters that approximate the immersion rate into the turbulent field.

The simulator system includes a software implementation of flight dynamics that adheres to the guidelines for turbulence set forth in military specifications. One of the features of the present simulator system is that it applies simulated turbulence to the rotor blades of the helicopter, rather than to its center of gravity. The simulator system accurately models the rotor penetration into a gust field. It includes time correlation between the front and rear of the main rotor, as well as between the side forces felt at the center of gravity and at the tail rotor. It also includes features for added realism, such as patchy turbulence and vertical gusts into which the rotor disc penetrates.

Briefly, the foregoing and other previously unattainable features and advantages of the present invention are realized by a unique real time implementation of the turbulence filters. The new simulator system uses two arrays, one on either side of the main rotor, to record the turbulence field and to produce time-correlation from the front to the rear of the rotor disc. The use of "Gaussian Interpolation" between the two arrays maintains the statistical properties of the turbulence across the rotor disc.

BRIEF DESCRIPTION OF THE DRAWINGS

The above and other features of the present invention and the manner of attaining them will become apparent, and the invention itself will be best understood, by reference to the following description and the accompanying drawings, wherein.

Similar numerals refer to similar elements in the drawing. It should be understood that the sizes of the different components in the Figures are not in exact proportion, and are shown for visual clarity and for the purpose of explanation.

DETAILED DESCRIPTION OF THE INVENTION

As used herein, turbulent fluid motion is an irregular condition of flow in which the various quantities show a random variation with time and space coordinates, so that statistical distinct average values can be discerned. According to this definition, the flow has to satisfy the condition of irregularity which highlights an important feature of turbulence. Because of the irregular nature of any turbulent flow, it is very difficult to describe it by deterministic functional relationships. On the other hand, turbulence velocities are generally random in the sense that it is possible to describe it by the laws of probability, hence a statistical approach is often adopted to describe atmospheric turbulence velocities.

The flight simulator used for performing the piloted simulation according to the present invention is NASA Ames Research Center's Vertical Motion Simulator (VMS). This simulator is a general purpose research tool that retains a high degree of flexibility to enable tailoring for a wide range of fixed and rotary wing applications. The simulator can be configured to meet the needs of a particular task by selecting hardware and software options. In a specific experiment related to the present invention, the simulator was configured for the purpose of evaluating the influence of stochastic turbulence created at the blade-element stations of a helicopter rotor simulator system.

Some key facilities of the simulator system are comprised of a motion simulator, a visual simulator, pilot controls, primary flight instrumentation, and a software or processor implementation of flight dynamics. These components are briefly described below.

Figure 1:
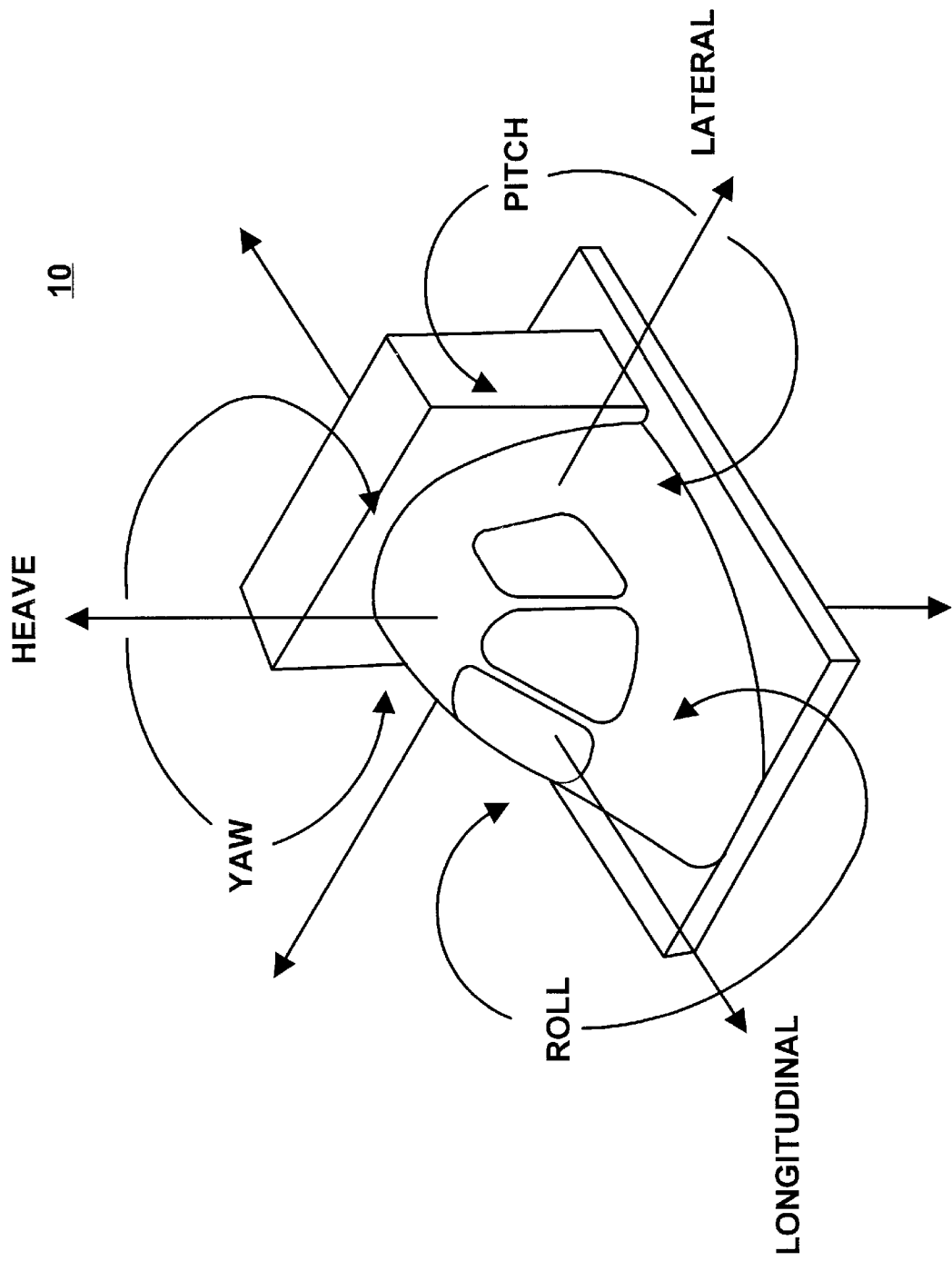
FIG. 1 is an isometric view of a helicopter cockpit module for use in conjunction with the simulator system and method according to the present invention.

The motion simulator system generally provides a cockpit module 10 with motion in all six axes (roll, pitch, yaw, heave, lateral and longitudinal), as shown in FIG. 1. The motion simulator system is capable of high accelerations, velocities and displacements, and notably, the performance described herein can be achieved simultaneously in all six degrees of freedom.

The visual simulator system generally provides a visual representation of the flight environment through monitors mounted in the cockpit module 10. The cockpit module 10, pilot controls and primary flight instrumentation are similar to those of a GENHEL UH60A Black Hawk helicopter. The software implementation of flight dynamics including all the requisite motion and visual communication software, has been executed on a single processor, with a cycle time of about 12 milliseconds.

The experimental simulations conducted at NASA Ames Research Center met with very favorable pilot opinion. Some of these simulations were implemented into the GENHEL UH60A mathematical model described in Howlett, J. J., "UH-60A Black Hawk Engineering Simulation Program: Vol. 1- Mathematical Model," NASA CR-166309, Dec. 1981. An heuristic model of turbulence was developed that preserves the Gaussian statistical characteristics of turbulence filters over the rotor disc. This model avoids the large computational and storage requirements of conventional investigations into rotorcraft turbulence models, such as those described in Prasad, J. V. R., Riaz, J., Gaonkar, G. H., Yingyi, D., "Real Time Implementation Aspects of a Rotorcraft Turbulence Simulation Method," 49th Annual Forum of the American Helicopter Society, St. Louis, Mo., May 1993, p. 459.

The present simulator system is designed to create and propagate all three translational components of turbulence in real time. The turbulence velocity components are superimposed at each blade element location as a function of the helicopter velocity, with distribution according to the blade element instantaneous geometry.

The entire stochastic rotor element turbulence model will be described herein. Examples from this model are presented for the helicopter in low speed flight (i.e., 10 knots). In this study the Dryden spectral form is selected due to its computational efficiency, although a discrete model of a curve-fit approximation to the von Karman form may alternatively be used. Spectral analysis of the simulation shows that the rotor-to-body attenuation is so severe that the original gust spectra appear to be of secondary consideration.

Conventional military specifications ("MIL SPEC") angular turbulence filters are a substitute for a finite-element distribution of translational turbulence in the air mass over the airframe. In the present simulator system only the rotor disc may be considered as an "airframe", and the translational turbulence in the air mass is distributed over the rotor disc to each blade element. This distribution produces rotor moments and forces. The MIL SPEC translational turbulence filters may be used in the present simulator model.

Figure 2:
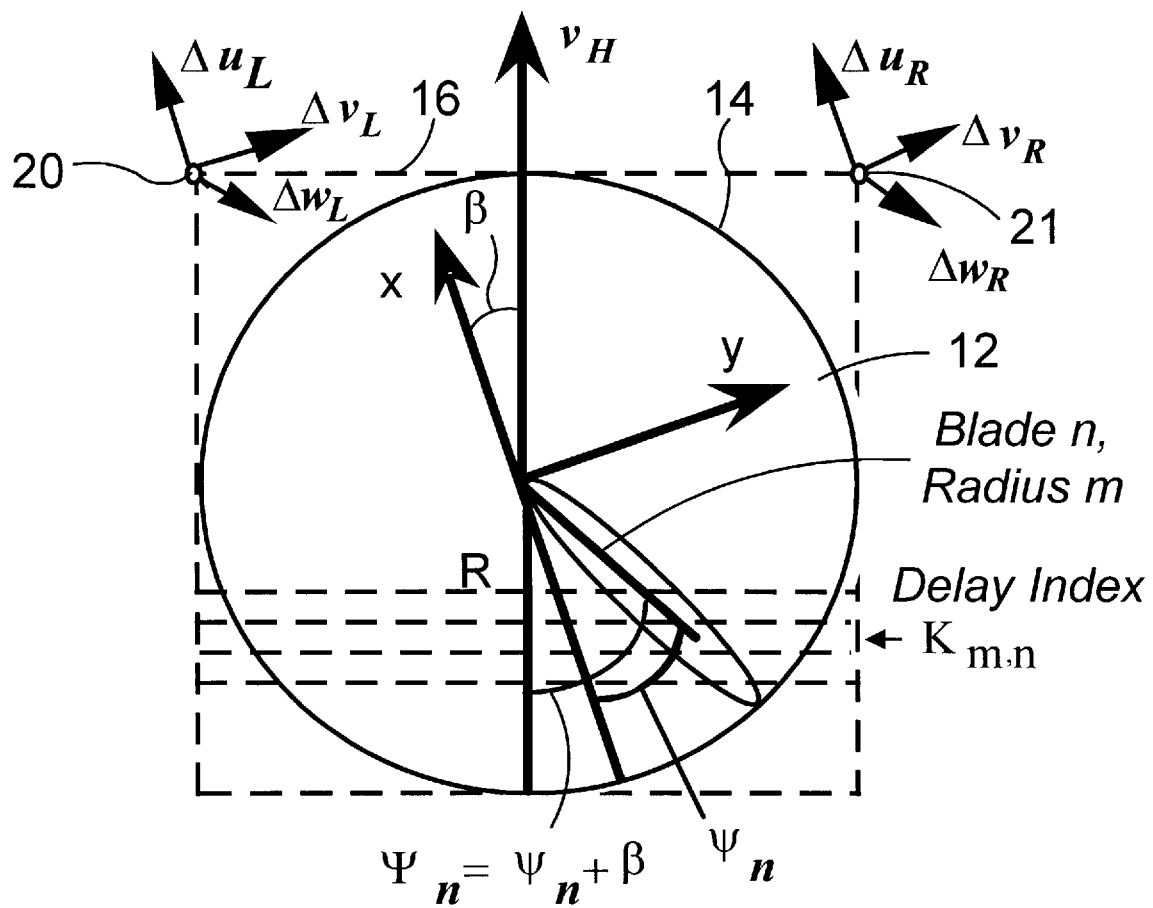
FIG. 2 is a top view of a simulated rotor disc forming part of the simulator system and method of the present invention, showing the rotor velocities and the added turbulence velocities.

Referring to FIG. 2, it is a diagrammatic representation of the rotor geometry, illustrating a rotor disc 12 in top plan view. The helicopter horizontal velocity component in the forward direction is represented by $V_H$, and the added turbulence velocity components are represented by $\Delta u_L$, $\Delta v_L$, $\Delta w_L$, $\Delta u_R$, $\Delta v_R$, $\Delta w_R$. Since the rotor disc 12 encounters turbulence at its leading edge 14, the line of turbulence which translates along the rotor disc 12 based on the velocity of the helicopter, is represented by the onset line 16. The onset line 16 is perpendicular to the vehicle forward flight path (i.e., the direction of $V_H$), and tangential to the leading edge of the rotor disc 12. The vertical added turbulence velocity components $\Delta w_L$ and $\Delta w_R$ and the horizontal added turbulence velocity components $\Delta u_L$, $\Delta v_L$, $\Delta U_R$, and $\Delta v_R$, which will be described later in greater detail, are represented by corresponding arrows at the left and right ends of the onset line 16.

From Taylor's hypothesis, the turbulent flow is stationary and homogeneous in the longitudinal direction. Turbulence filter outputs are statistically valid at either fixed spatial locations or at points translating with the helicopter, as is the case in the conventional body-fixed formulation. The outputs of the turbulence filters are applicable at points on the onset line 16 at the discrete time points. Interpolation perpendicular to the onset line 16 requires a transport delay that is proportional to the distance along the flight path to the blade element location, and inversely proportional to the helicopter aerodynamic velocity. The turbulence is assumed uncorrelated at each side of the rotor disc 12, and homogeneous in the lateral dimension. The statistical properties of the turbulence are then invariant over the entire rotor disc 12 by using "Gaussian Interpolation" between values applicable on each side of the rotor disc 12.

In a particular simulation using the Black Hawk helicopter model, the rotor system has four blades (N=4). For each of the blades the number of segments used in the simulation was five (M=5). The blade and segment indices are defined, as follows:

$1 < n < N$ (blades)

$1 < m < M$ (segments)

The finite element analysis is performed using in part the equal-annuli algorithm described in Howlett, J. J., "UH-60A Black Hawk Engineering Simulation Program: Vol. I -Mathematical Model," NASA CR-1 66309, Dec. 1981, to generate the radii ($r_m$) to the blade stations. $r_m$ may be computed as follows:

$$r_m = \sqrt{(e+e')^2 + \frac{\left(m - \frac{1}{2}\right)}{M}[R^2 - (e+e')^2]} - e$$

where the rotor radius is R=268 ft, the hinge offset is e=1.2 ft, and the spar length is e'=2.2 ft.

The azimuth angle of the $n^{th}$ blade with respect to the helicopter aft centerline is given by the following equation:

$$\psi_n = \int \Omega dt + 2\pi \left(\frac{n-1}{N}\right).$$

where $\Omega$=27 rad/sec is the nominal rotor RPM.

In the present model, rather than defining the translational disturbance velocities at the helicopter center of gravity, they are defined at two onset points 20, 21 located along the onset line 16. Using Gaussian inputs, three independent turbulence velocity histories are computed at each of these two points 20, 21 in real time. These histories are updated each cycle time, and the pertinent values from these histories are distributed to the individual segment locations by temporal and geometrical algorithms.

The helicopter horizontal velocity component in the forward direction ($v_H$) may be defined approximately by the following equation, where $u_b$ is the helicopter longitudinal aerodynamic velocity and $v_b$ is the lateral aerodynamic velocity:

$$v_H = \sqrt{u_b^2 + v_b^2}$$

Using the velocity $v_H$, the sideslip angle "β" and the perpendicular onset line 16 shown in FIG. 2, the aerodynamic azimuth angle (wind axis) $\Psi_n$ for the $n^{th}$ blade would then be defined by the following equation:

$$\Psi_n = \psi_n = \beta$$

where $\psi_n$ is the $n^{th}$ blade geometrical azimuth angle from aft.

This geometry is sufficient to establish the longitudinal distribution. The left and right Dryden filters receive Gaussian inputs, so the outputs of these linear filters are also Gaussian. Furthermore, a transport delay in these outputs does not alter the statistical characteristics. The outputs of the filters are stored in tables, which are updated each cycle time. The value applicable for a given element is determined by selecting a value from the tables. Given that the table size is established (i.e., $K_M$=500) for storing time histories of the outputs of the filters, the minimum aerodynamic velocity $V_{min}$ in that may be accommodated is determined by distributing the table over the rotor diameter:

$$v_{min} = \frac{2R}{K_M \Delta t}$$

If a smaller minimum velocity is required, a larger table size must be selected. For the simulation cycle time $\Delta t$=0.012 sec, the minimum velocity for $K_M$=500 is 8.944 ft/sec (5.3 knots). The rotor-plane aerodynamic velocity used in the turbulence filters is restricted to this minimum.

$$v_{uv} = \begin{cases} v_{min} & v_H < v_{min} \\ v_H & v_H \geq v_{min} \end{cases}$$

For this simulation, independent of vehicle velocity, exactly $K_M \Delta t$=6 seconds of data is stored in the tables. Time histories of the outputs of six turbulence filters are contained in six separate tables, each of length $K_M$. At the minimum velocity the individual cells correspond to a length of 0.10732 ft (such that 500 cells of the tables span the rotor diameter), whereas at a velocity of 100 ft/sec (59.2 knots), for example, the cells are each 1.2 ft long such that only 45 cells are needed to span the rotor diameter.

In order to select the velocities to be used from the tables, for any blade element, an integer index in the table for the blade element turbulence ($k_{m,n}$) is computed to determine the blade element perpendicular distance from the onset line. Defining, $$r_{m,n} = R + r_m \cos \Psi_n$$

the delay index ($k_{m,n}$) is defined by the following equation:

$$k_{m,n} = \left\lceil \frac{r_{m,n}}{v_{uv}\Delta t} \right\rceil$$

where the upper brackets denote the integer ceiling operation. The tables extend beyond the rotor disc for higher vehicle velocities than the minimum, such that stationary outputs are available for table size increases caused by decreases in velocity.

The Dryden model will now be described in more detail. It is known that the low-altitude vertical turbulence scale length ($L_w$) is given as a piecewise continuous function of altitude (h), as follows:

$$L_w = \begin{cases} 10 & h < 10 \text{ ft} \\ h & 10 \leq h \leq 1000 \text{ ft} \\ 1000 & h > 1000 \text{ ft} \end{cases}$$

and the in-plane scale lengths $L_u$ and $L_v$ are given by the following functions:

$$L_u = L_v = \begin{cases} 75.64 & h < 10 \text{ ft} \\ hf_{uv}^{1.2} & 10 \leq h \leq 1000 \text{ ft} \\ 1000 & h > 1000 \text{ ft} \end{cases}$$

where $f_{uv}$ is defined by:

$$f_{uv} = 0.177 + 0.000823h$$

The horizontal turbulence RMS intensities $\sigma_u, \sigma_v$ are a function of the selected vertical turbulence intensity $\sigma_w$, $$\sigma_u = \sigma_v = \sigma_w f_{uv}^{-0.4}$$

The results shown herein are for $\sigma_w = 5$ ft/sec, h=200 ft, and $v_H = 16.9$ ft/sec (10 knots).

Using Taylor's frozen field hypothesis, the Dryden form of the linear turbulence transfer functions are given by the following equations:

$$\Delta u(s) = \frac{\sigma_u \sqrt{2v_{uv}/\pi L_u}}{s + v_{uv}/L_u}$$

$$\Delta v(s) = \frac{\sigma_v \sqrt{v_{uv}/\pi L_v} \, (\sqrt{3} \, s + v_{uv}/L_v)}{(s + v_{uv}/L_v)^2}$$

$$\Delta w(s) = \frac{\sigma_w \sqrt{v_{uv}/\pi L_w} \, (\sqrt{3} \, s + v_{uv}/L_w)}{(s + v_{uv}/L_w)^2}$$

The angular transfer functions are developed from partial differential equations relating these translational disturbances to the immersion rate of the aircraft into the turbulent field. These equations use a parameter "b", which is the wing span length of the helicopter. In an exemplary simulation "b" is approximately 26 ft.

$$\Delta ps = \frac{\sigma_w \left(\frac{\pi}{4b}\right)^{7/6} \sqrt{0.8v_{uv}}}{L_w^{1/3}\left(s + \frac{\pi v_{uv}}{4b}\right)}$$

$$\Delta q(s) = \frac{\frac{\pi}{4b} s \Delta w(s)}{s + \frac{\pi v_{uv}}{4b}}$$

$$\Delta r(s) = \frac{\frac{\pi}{3b} s \Delta v(s)}{s + \frac{\pi v_{uv}}{3b}}$$

These angular disturbances are not used in the illustrated simulation model because the geometry is considered in the points of application of the translational turbulence excitations. The asymmetric turbulence velocities produce moments, which, in turn, produce angular activity. The angular disturbance equations are meant to approximate the body dynamics. The new turbulence implementation uses the body's own interactions with the rotor to produce angular disturbances.

Continuous transfer functions involving random inputs are typically converted to discrete form using the zero-order hold formulation, where the input is assumed constant over each computer cycle $\Delta t$. The z-transforms of Laplace functions $f_i(s)$ then become, $$F_i(z) = Z\left\{\left(\frac{1 - e^{-s\Delta t}}{s}\right) f_i(s)\right\}$$

which may then be converted to difference equations for discrete implementation.

Using this technique on the Dryden transfer functions produces the following coefficients:

$$\gamma_u = v_{uv}\Delta t/L_u$$

$$f_1 = e^{-\gamma_u}$$

$$f_2 = \sigma_u(1 - f_1)\sqrt{2/\gamma_u}$$

$$\gamma_v = v_{uv}\Delta t/L_v$$

$$g_1 = 2e^{-\gamma_v}$$

$$g_2 = -e^{-2\gamma_v}$$

$$g_3 = [\sigma_v/\sqrt{\gamma_v}][1 - e^{-\gamma_v} + (\sqrt{3} - 1)e^{-\gamma_v}\gamma_v]$$

$$g_4 = -[\sigma_v e^{-\gamma_v}/\sqrt{\gamma_v}][1 - e^{-\gamma_v} + (\sqrt{3} - 1)\gamma_v]$$

$$\gamma_w = v_{uv}\Delta t/L_w$$

$$h_1 = 2e^{-\gamma_w}$$

$$h_2 = -e^{-2\gamma_w}$$

$$h_3 = [\sigma_w/\sqrt{\gamma_w}][1 - e^{-\gamma_w} + (\sqrt{3} - 1)e^{-\gamma_w}\gamma_w]$$

$$h_4 = -[\sigma_w e^{-\gamma_w}/\sqrt{\gamma_w}][1 - e^{-\gamma_w} + (\sqrt{3} - 1)\gamma_w]$$

These coefficients are used in the following six difference equations, each driven by an independent Gaussian noise source $n_i$, with a zero mean value and a unity standard deviation.

$\Delta u_L(k)=f_1\Delta u_L(k-1)+f_2 n_1(k)$ $\Delta u_R(k)=f_1\Delta u_R(k-1)+f_2 n_2(k)$ $\Delta v_L(k)=g_1\Delta v_L(k-1)+g_2\Delta v_L(k-2)$ $+g_3 n_3(k)+g_4 n_3(k-1)$ $\Delta v_R(k)=g_1\Delta v_R(k-1)+g_2\Delta v_R(k-2)$ $+g_3 n_4(k)+g_4 n_4(k-1)$ $\Delta w_L(k)=h_1\Delta w_L(k-1)+h_2\Delta w_L(k-2)$ $+h_3 n_5(k)+h_4 n_5(k-1)$ $\Delta W_R(k)=h_1\Delta W_R(k-1)+h_2\Delta W_R(k-2)$ $+h_3 n_6(k)+h_4 n_6(k-1)$ These computationally efficient equations produce stable outputs for all stable inputs. For the body-fixed formulation these velocities are superimposed at the center of gravity. However, in the present simulator system, these velocities are created at the two onset points 20, 21 and then distributed and superimposed at the various blade element locations. They produce forces and moments because they modify the angle of attack of each blade element.

Figure 3A:
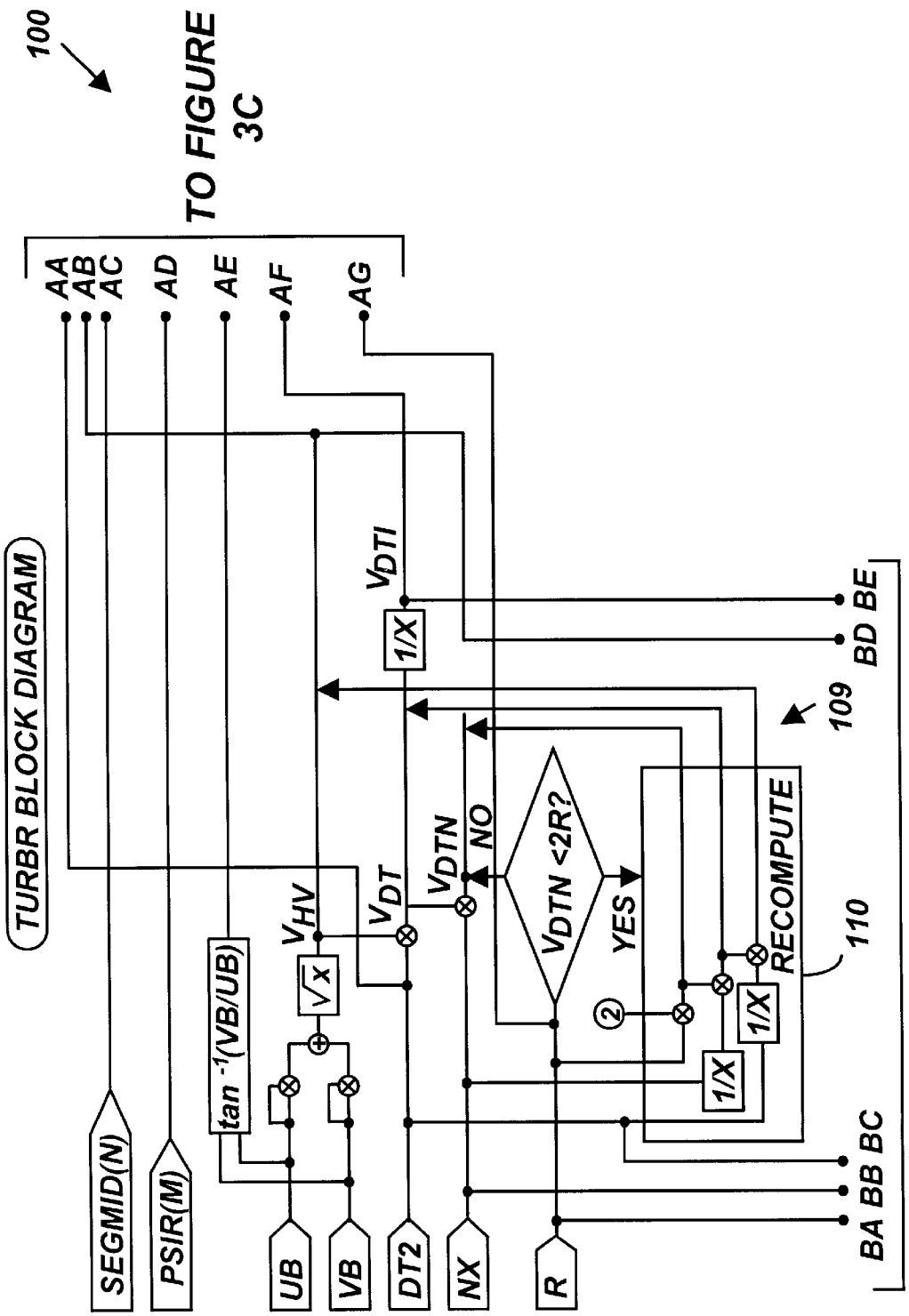
FIGS. 3A, 3B, 3C and 3D represent a functional block diagram of the present simulator system titled "TURBR"
Figure 3B:
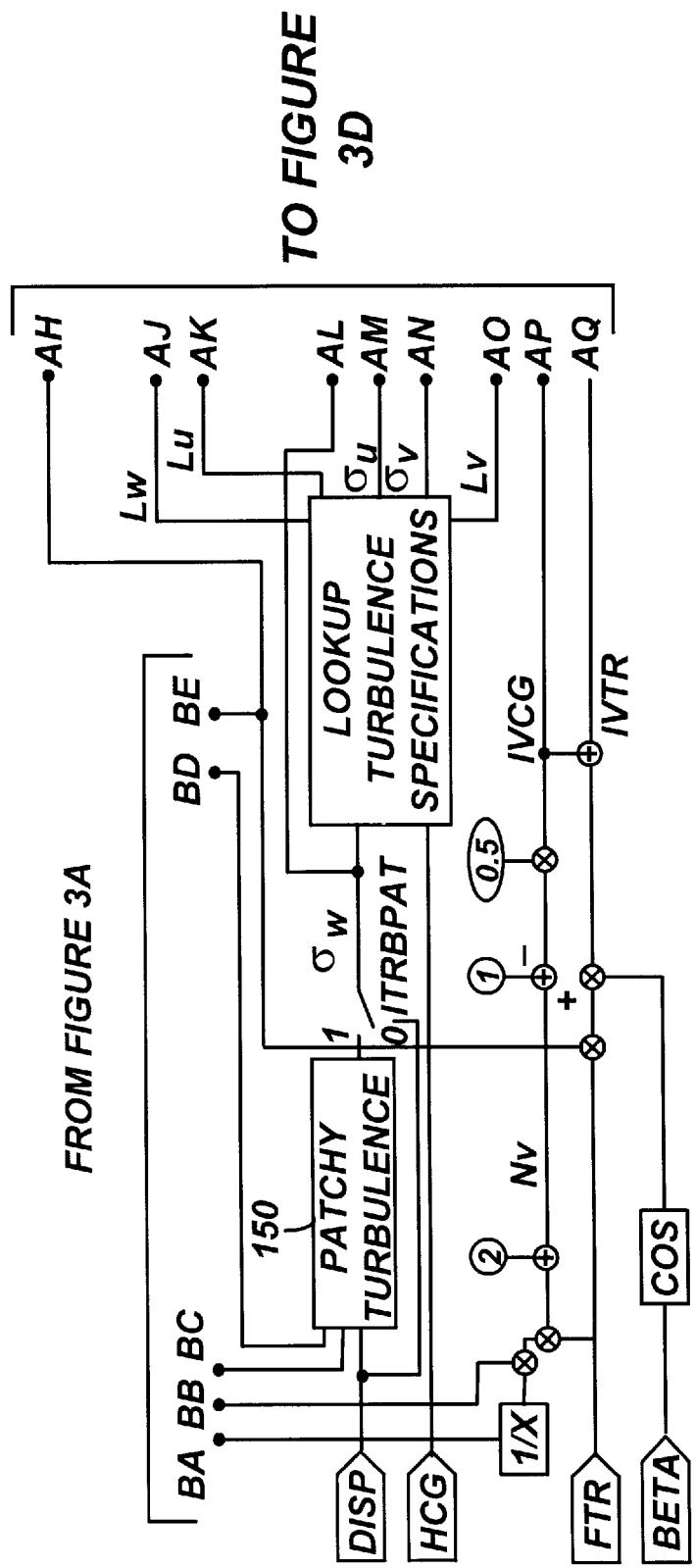
Figure 3C:
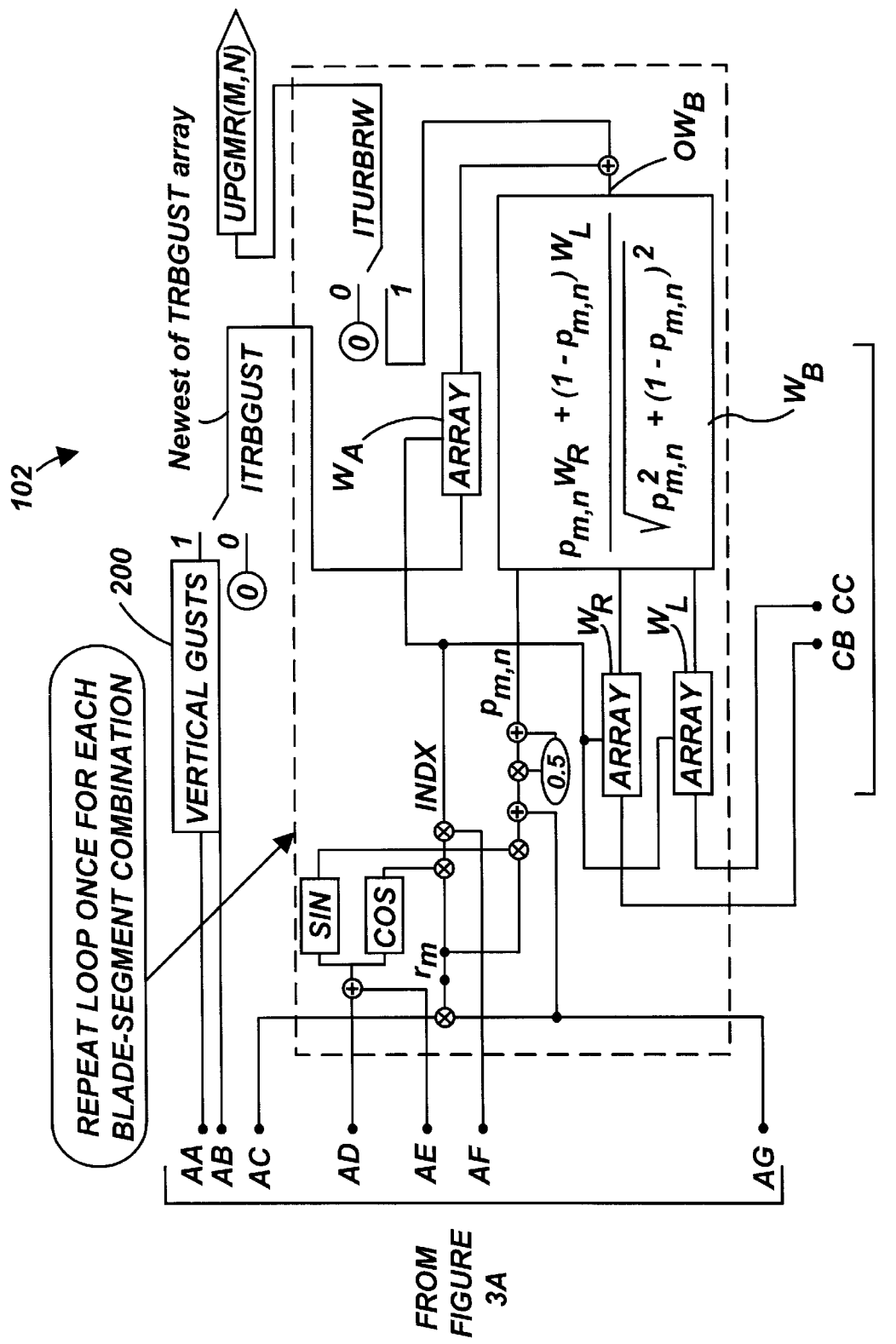

The foregoing analytical study will now be correlated more specifically to the block diagrams in FIGS. 3A, 3B, 3C, with reference to the following two tables of variables.

TABLE I

TURBR VARIABLES

| Name | Description |
|---|---|
| BETA | Sideslip Angle |
| DISP | Dispersion - standard deviation of vertical turbulence |
| DT2 | Cycle Time |
| FIRSTELM | Value of single input for all segments |
| FTR | Distance from CG to TR in feet |
| GAINU | Scale factor for U-body turbulence |
| GAINV | Scale factor for V-body turbulence |
| HCG | Height |
| IFIRSTELM | Use single input for all segments |
| INDX | Index for segment arrays |
| ITRBGUST | Use vertical gusts |
| ITRBPAT | Use Patchy Turbulence |
| ITURBRW | Allow segment inputs |
| ITWBD | Create vertical body turbulence |
| IVCG | Index for CG for V-array |
| IVTR | Index for Tail Rotor for V-array |
| Nx | Number of cells in the main rotor arrays |
| PSIR(M) | Angle to blade #1 in radians |
| R, RMR | Main Rotor Radius |
| SEGMID(N) | Midpoints of the segments (in fractions or RMR) |
| UB | X-velocity (ft/s) |
| UPGMR(M,N) | Segment turbulence components |
| UTURB | U - Body Turbulence |
| VB | Y-velocity (ft/s) |
| VTURB | V - Body Turbulence |
| VYGTR | Tail rotor Y-gust component |
| WTURB | W - Body Turbulence |

TABLE II

EXTRA SECTIONS
(VERTICAL GUSTS, PATCHES OF TURBULENCE)

| Gust-Name | Patch-Name | Description |
|---|---|---|
| TIME, A(303) | TIME, A(303) | Total time since beginning operate |
| DT2, A(168) | DT2, A(168) | Cycle time |
| GTLGUS | PTLSIG | Time since last change of output |
| GTRNDW | PTRNDW | Time to wait until next change of output |
| GLMBD | PLMBD | Average time to wait between changes |
| GLMBDMX | PLMBDMX | Max Average time |
| GLMBDMN | PLMBDMN | Min Average time |
| GRMPT | PRMPT | Time to ramp in the change |
| GRMPTMX | PRMPTMX | Max Ramp time |
| GRMPTMN | PRMPTMN | Min Ramp time |
| GVMIN | PVMIN | Minimum velocity |
| GVMAX | PVMAX | Maximum velocity |
| GUSTNEW | PSIGNEW | New output value to ramp toward |
| GOUT | POUT | Current output value |

Given the height above ground (h) and vertical standard deviation ($\sigma_w$), the remaining turbulence specifications can be defined as follows: The function $f_h$ appendix is given by the following equation:

$f_h=0.177+0.000823h$

TABLE III

TURBULENCE SPECIFICATIONS

| | | |
|---|---|---|
| $L_u, L_v$ | $\begin{cases} 37.82 \\ hf_h^{-1.2}/2 \\ h/2 \\ 875 \end{cases}$ | $\begin{matrix} h \leq 10 \\ 10 < h \leq 1000 \\ 1000 < h \leq 175 \\ h \geq 1750 \end{matrix}$ |
| $L_w$ | $\begin{cases} 5 \\ h/2 \\ 875 \end{cases}$ | $\begin{matrix} h \leq 10 \\ 10 < h \leq 175 \\ h > 1750 \end{matrix}$ |
| $\sigma_u, \sigma_v$ | $\begin{cases} (0.18523)\sigma_w \\ \sigma_w f_h^{-0.4} \\ \sigma_w \end{cases}$ | $\begin{matrix} h \leq 10 \\ 10 < h < 1000 \\ h \geq 1000 \end{matrix}$ |

FIG. 3A shows 11 parameters that are input to the simulator system, and generally grouped into four different groups, as illustrated in the following table IV:

TABLE IV

PARAMETERS GROUPING

| Group | Parameter |
|---|---|
| Rotor Geometry | SEGMID(N), PSIR(M), R, FTR, BETA |
| Helicopter Dynamics | UB, VB, HCG |
| Simulator System Variable | DT2 |
| Turbulence Variable Determined by User | NX, DISP |

FIGS. 3A, 3B, 3C and 3D combined represent a functional block diagram of the present simulator system herein titled "TURBR". For simplicity of description, the circuits shown in FIGS. 3A and 3B will be collectively referred to as the input circuit 100, the circuit shown in FIG. 3C will be referred to as the blade-element turbulence circuit 102, and the circuit shown in FIG. 3D will be referred to as the bodyturbulence circuit 104.

Referring to FIGS. 3A and 3B, the input circuit 100 generates the following output signals that are fed to the blade-element turbulence circuit 102 in FIG. 3C:

AA: corresponds to DT2.

AB: corresponds to $V_{HV}$, which is calculated as follows:

$v_{HV}=(UB^2+VB^2)^{1/2}$

AC: corresponds to SEGMID(N).

AD: corresponds to PSIR(M).

AE: is calculated as follows:

$$\tan^{-1}(VB/UB)$$

AF: corresponds to $V_{DTI}$, which is calculated as follows:

$$1/v_{DT}, \text{ where } v_{DT}=(DT2).(V_{HV})$$

AG: corresponds to R.

Figure 3D:
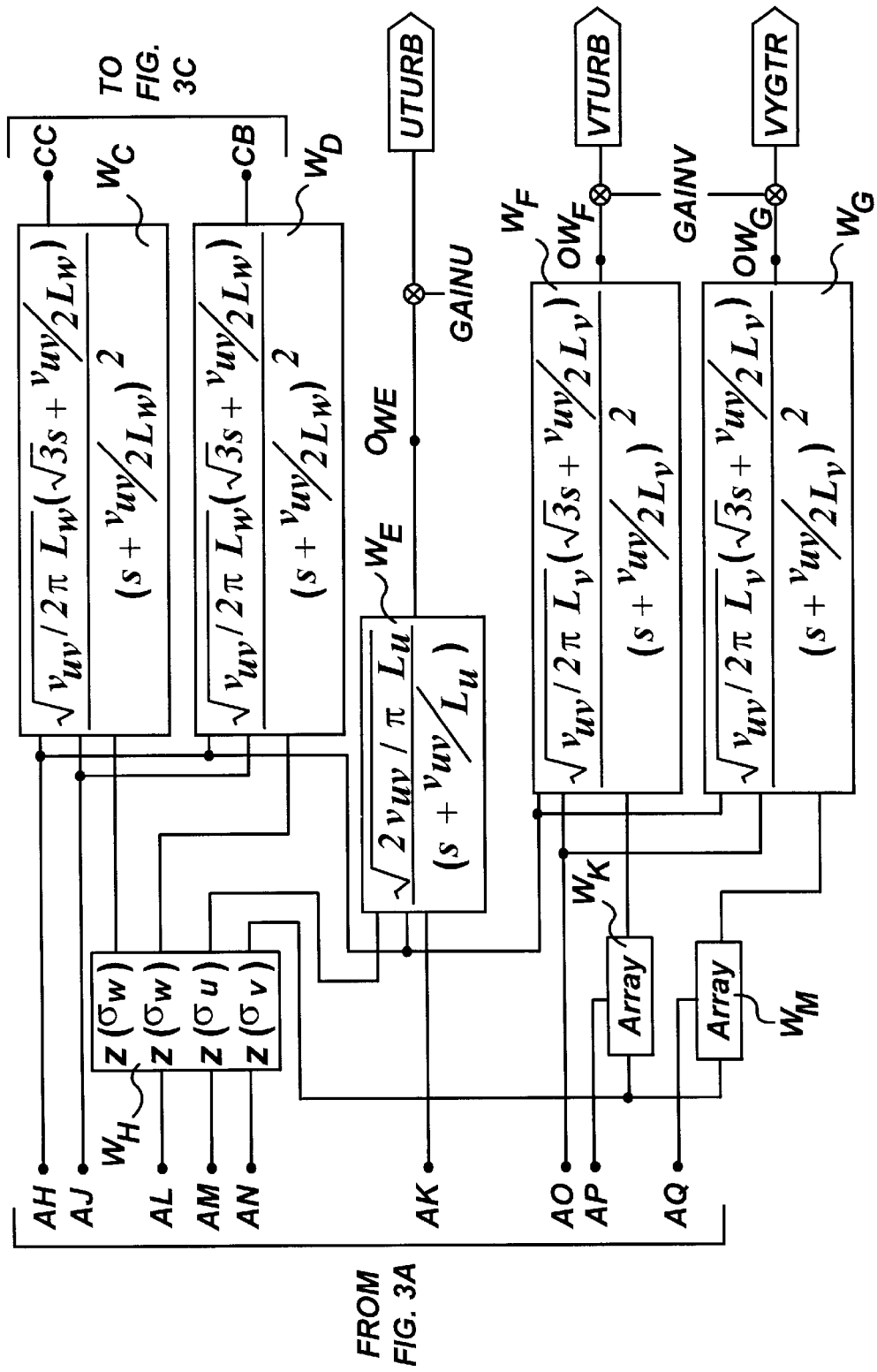
Figure 4:
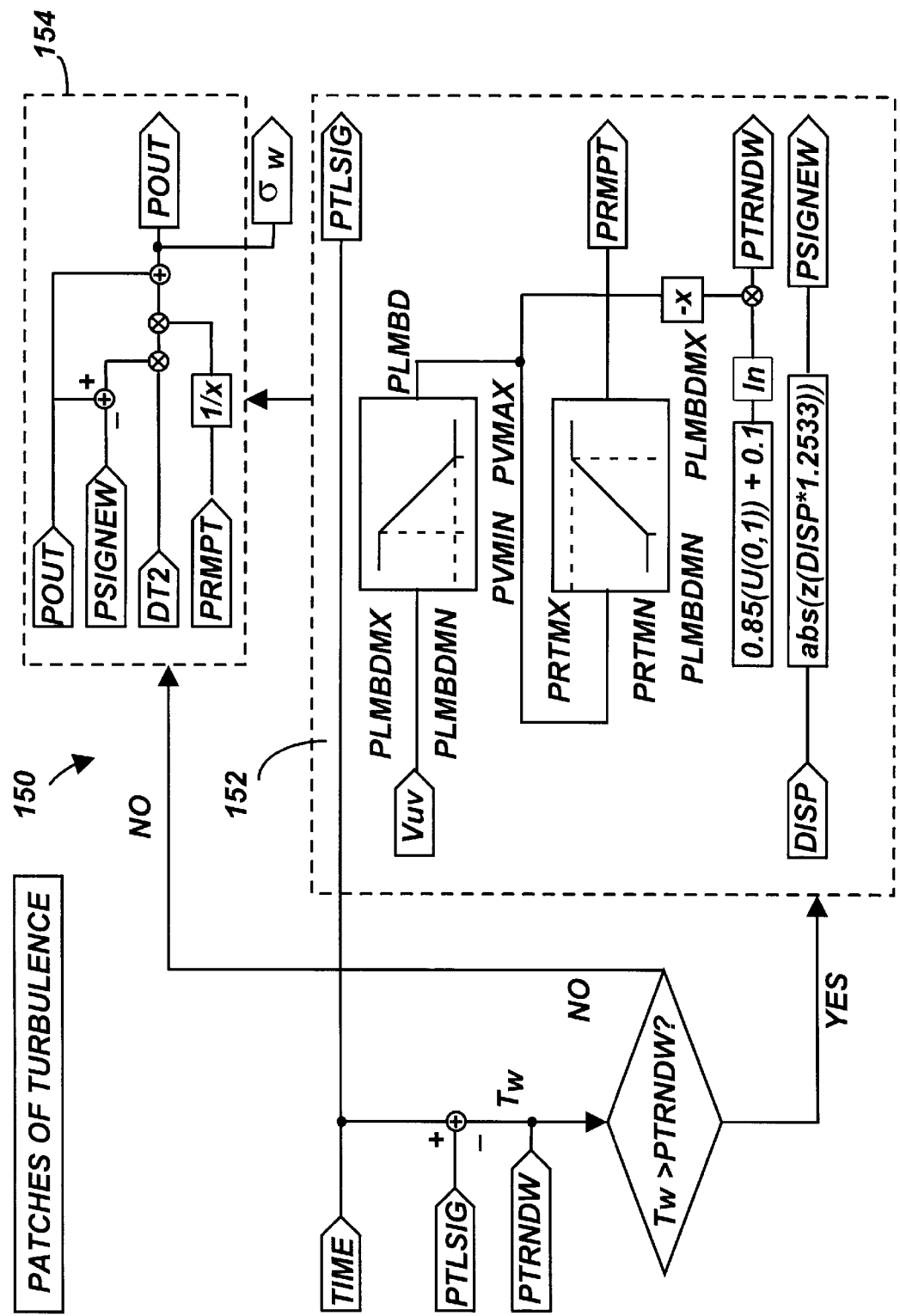
FIG. 4 represents a block diagram of the Patches of Turbulence circuit used in the present simulator system.

The following output signals in FIG. 3B are fed to the body-turbulence circuit 104 in FIG. 3D:

AH: corresponds to $V_{HV}$, and is fed to the Patches of Turbulence circuit 150 (FIG. 4).

AJ: corresponds to Lw in the above Table IV - Turbulence Specifications.

AK: corresponds to Lu in the above Table IV - Turbulence Specifications.

AL: corresponds either to $\sigma_W$ at the output of the Patches of Turbulence circuit 150 in FIG. 4, or to DISP. ITRBPAT is a flag which chooses the "Patches of Turbulence" $\sigma_W$ or a user specified field $\sigma_W$ in the variable display.

AM: corresponds to $\sigma_u$ in the above Table IV - Turbulence Specifications.

AN: corresponds to $\sigma_v$ in the above Table IV - Turbulence Specifications.

AO: corresponds to Lv in the above Table IV - Turbulence Specifications.

AP: corresponds to IVCG, which is calculated as follows:

$$IVCG=(Nv-1)\times 0.5,$$

$$\text{where } Nv=[(Nx/R)(FTR)]+2$$

AQ: corresponds to IVTR, which is calculated as follows:

$$[FTR \times v_{DTI} \times \cos(BETA)]+IVCG.$$

A loop 109 performs the following routine: If $V_{DTN}$ is greater than, or equal to 2R, no recompute is needed. If, on the other hand, $V_{DTN}$ is less than 2R, the recompute routine 110 is executed. This corresponds to the velocity being below the minimum velocity allowed by the table size, and performs the corresponding equation above relating to Vuv.

With reference to FIG. 3C the input signals AA, AB, AC, AD, AE, AF, AG to the blade-element turbulence circuit 102 are processed as follows:

AA and AB are input to a vertical gust circuit 200 (shown in detail in FIG. 5) whose output may used when a flag (ITRBGUST=1), or is not used when the flag (ITRBGUST=0), and which corresponds to the newest of TRBGUST array.

AD and AE are added to provide the angle of each blade (one blade at a time) relative to the direction of translation $V_H$. The cosine of the blade angle is calculated and multiplied by $r_m$ (where $r_m$=AC×AG, as described above) and also by AF, to generate INDX. INDX is then simultaneously fed to three arrays $W_A$, $W_R$, $W_L$, where the array $W_A$ holds the outputs of the Vertical Gusts circuit 200, and the arrays $W_R$ and $W_L$ hold the turbulence values found at the onset point. The sine of the blade angle is also calculated and is processed as follows to generate $P_{m,n}$:

$$p_{m,n}=[\{[(\text{Sine of blade angle})*(r_m)]+[AG]\}\times 0.5]+0.5.$$

Input signals CB and CC are respectively fed from the body-turbulence circuit 104 (FIG. 3D) to the arrays $W_R$ and $W_L$. $p_{m,n}$ and the outputs of arrays $W_R$ and $W_L$ are fed to a Gaussian Interpolation circuit $W_B$ whose output $OW_B$ is defined by the following equation:

$$OW_B = \frac{p_{m,n}w_R + (1-p_{m,n})w_L}{\sqrt{p_{m,n}^2 + (1-p_{m,n})^2}}$$

The outputs of array $W_A$ and circuit $W_B$ are added to provide the total turbulence input UPGMR(M,N) to the blade segment. It should be noted that the circuit inside the rectangle in dashed lines constitutes a loop which is repeated for each blade-segment combination (i.e., twenty times in the present example).

With reference to FIG. 3D, the input signals AH, AJ, AK, AL, AM, AM, AO, AP, AQ to the body-turbulence circuit 104 are processed as follows:

AH, AJ, and a Gaussian random number $Z(\sigma_W)$ are fed into a Dryden turbulence filter $W_C$ for generating signal CC according to the following equation:

$$\frac{\sqrt{v_{uv}/2\pi L_w} \; (\sqrt{3} \; s + v_{uv}/2L_w)}{(s + v_{uv}/2L_w)^2}$$

AH, AJ, and the Gaussian random number $z(\sigma_w)$ are fed into a Dryden turbulence filter $W_D$ for generating signal CB according to the following equation:

$$\frac{\sqrt{v_{uv}/2\pi L_w} \; (\sqrt{3} \; s + v_{uv}/2L_w)}{(s + v_{uv}/2L_w)^2}$$

Signals AL, AM and AN are fed into a Gaussian Random Numbers calculation filter $W_H$, one of whose outputs $z(\sigma_u)$ is fed into a Dryden turbulence filter $W_E$ along with signals AH and AK, for generating a signal $OW_E$ according to the following equation:

$$\frac{\sqrt{2v_{uv}/\pi L_u}}{(s + v_{uv}/L_u)}$$

Signal $OW_E$ is then multiplied by GAINU to generate output signal UTURB.

Another output $z(\sigma_v)$ of the Gaussian Random Numbers calculation filter $W_H$ is fed simultaneously into two arrays $W_K$ and $W_M$. Signal AP is the index into array $W_K$, and signal AQ is the index into array $W_M$. The output of array $W_K$ is fed into a Dryden turbulence filter $W_F$ along with signals AH and AO to generate a signal $OW_E$ according to the following equation:

$$\frac{\sqrt{v_{uv}/2\pi L_v} \; (\sqrt{3} \; s + v_{uv}/2L_v)}{(s + v_{uv}/2L_v)^2}$$

Similarly, the output of array $W_M$ is fed into a Dryden turbulence filter $W_G$ along with signals AH and AO to generate a signal $OW_G$ according to the following equation:

$$\frac{\sqrt{v_{uv}/2\pi L_v} \ (\sqrt{3} \ s + v_{uv}/2L_v)}{(s + v_{uv}/2L_v)^2}$$

Each of the signals $OW_E$ and $OW_G$ is then multiplied by GAINV, to generate output signals VTURB and VYGTR, respectively.

The two arrays $W_K$ and $W_M$ are useful for correlating the side gusts entering the center of gravity and the side gusts entering the tail rotor. For instance, if the simulation helicopter were flying forward through a sudden side gust, the center of gravity of the helicopter would respond before the tail rotor enters the gust, thus providing a realistic response. In another situation where the helicopter were flying backward through the sudden side gust, the tail rotor will respond to the gust before the center of gravity does. Therefore, the two arrays $W_K$ and $W_M$ may delay the response of either the center of gravity or the tail rotor relative to each other, based on the velocity of the helicopter to provide a realistic response to gust conditions.

In addition, the present model renders a realistic turbulence simulation and provides a correlation to the terrain and other considerations from the physical environment surrounding the helicopter. To this end, the present model is provided with multiple spatial inputs, such as at the two onset points 20, 21, and at two side input locations: the center of gravity and the tail rotor. Turbulence is initiated for all the segments at the two onset points 20, 21. VTURB signal represents the turbulence velocity that is applied to the center of gravity, and VYGTR represents the lateral velocity in the Y direction that is applied to the tail rotor.

Referring now to FIG. 4, it represents a block diagram of the Patches of Turbulence circuit 150. The waiting time Tw is calculated according to the following equation:

$$Tw = Time - PTLSIG$$

A software or firmware routine embedded in the circuit 150 inquires whether Tw is greater than the random wait time PTRNDW. If Tw is greater than the random wait time PTRNDW, the software runs a routine 152 followed by a routine 154. If, on the other hand, Tw does not exceed the random wait time PTRNDW, then the software runs routine 154.

The routine 152 will now be described. Vuv is fed into a look up table for generating the corresponding PLMBD, which is then fed into another look-up table for generating output signal PRMPT. Output signals PTRNDW and PSIGNEW are also generated according to the following equations:

$$PTRNDW = PLMBD \times ln[0.85(U(0,1))+0.1]$$

$$PSIGNEW = abs(z(DISP^* \ 1.2533))$$

where U is a uniform random number, and z is a Gaussian random number.

The routine 154 will now be described. The output signal $\sigma_w$ is determined according to the following equation:

$$\sigma_w = [(POUT - PSIGNEW) \ (DT2)/(PRMPT)] + POUT$$

Figure 5:
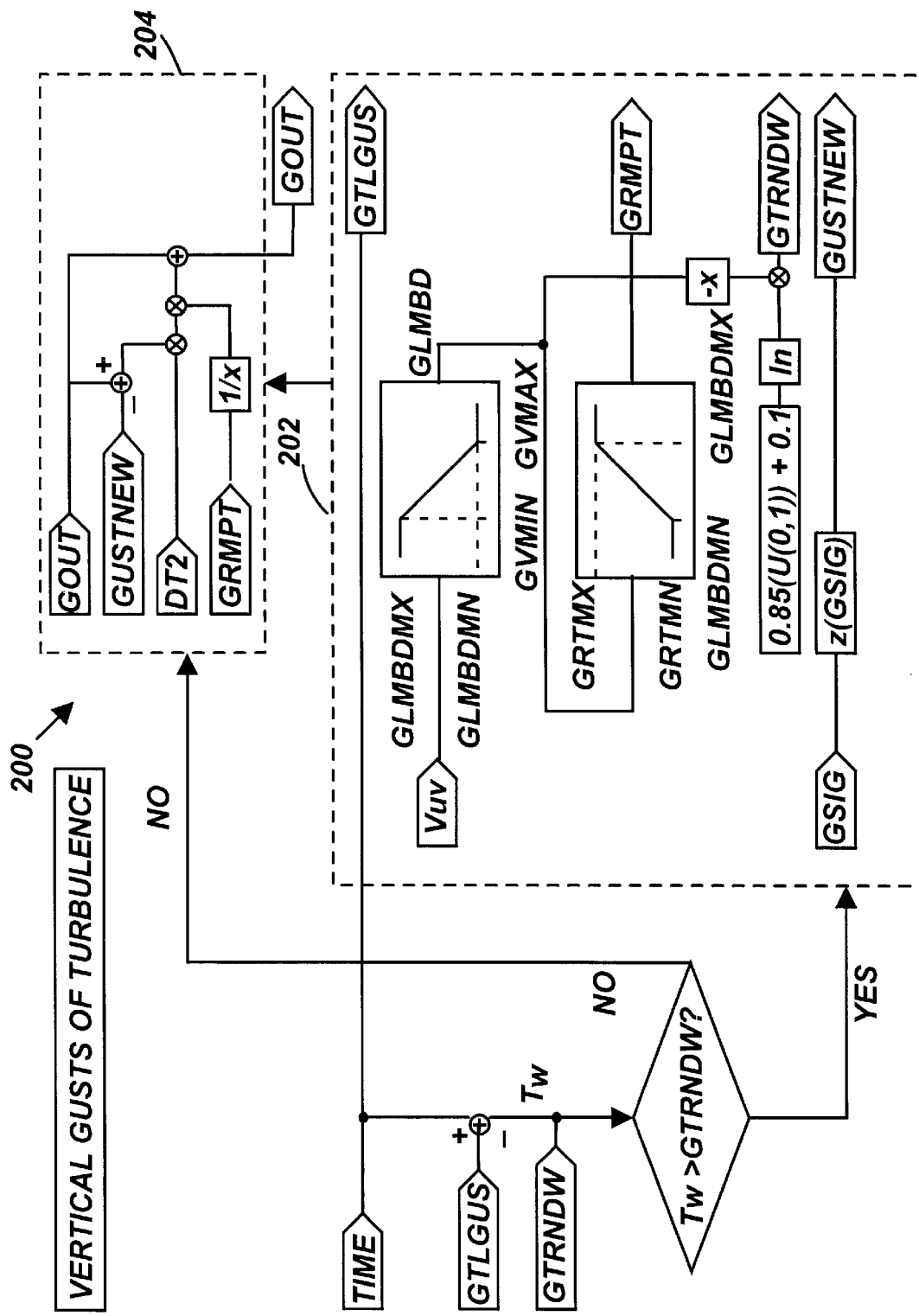
FIG. 5 represents a block diagram of the Vertical Gusts of Turbulence circuit used in the present simulator system.

Referring now to FIG. 5, it represents a block diagram of the Vertical Gusts of Turbulence circuit 200. The circuit 200 is similar to the Patches of Turbulence circuit 150 (FIG. 4), with the exception that it includes two routines 202 and 204. The routine 202 is similar to the routine 152 (FIG. 4) except that GSIG is used according to the following equation, to generate an output signal GUSTNEW:

$$GUSTNEW = z(GSIG),$$

where z is a Gaussian random number.

While specific embodiments of the system and method for finite element simulation of helicopter turbulence have been illustrated and described in accordance with the present invention, modifications and changes of the apparatus, parameters, use and operation will become apparent to those skilled in the art, without departing from the scope of the invention.

What is claimed is:

1. A simulator system for use in real-time piloted helicopter simulation, the helicopter having a center of gravity, rotor disc, a tail rotor, a plurality of blades, each of which including a plurality of blade-element stations, the system comprising in combination:

a processor for applying finite element turbulence simulation to the rotor blades of the helicopter, for creating and propagating three translational components of turbulence in real time, and for superposing turbulence velocity components at each blade element station as a function of helicopter velocity, with distribution according to each blade element instantaneous geometry;

an onset line representing a line of turbulence along the rotor disc, said onset line being tangential to the rotor disc, with said turbulence velocity components being applied at two points along said onset line;

said processor periodically updating said turbulence velocity components and distributing the updated turbulence velocity components to the individual blade-segment stations; and at least one array $W_K$, $W_M$ for correlating gusts entering the center of gravity and gusts entering the tail rotor, and for delaying the response of either the center of gravity or the tail rotor relative to each other, based on the velocity of the helicopter to provide a realistic response to gust conditions.

2. The simulator system according to claim 1, wherein said processor includes an input circuit, a blade-element turbulence circuit and a body-turbulence circuit.

3. The simulator system according to claim 2, wherein said input circuit generates a plurality of output signals (AA, AB, AC, AD, AE, AF, AG) that are fed to a body-turbulence circuit, and that generally correspond to, and are derived from the helicopter rotor geometry and dynamics parameters, simulator system variables, and turbulence variables.

4. The simulator system according to claim 3, wherein said input circuit further generates a plurality of output signals (AH, AJ, AK, AL, AM, AN, AO, AP, AQ) that are fed to said blade-element turbulence circuit, and that generally correspond to, and are derived from the helicopter rotor geometry and dynamics parameters, simulator system variables, and turbulence variables.

5. The simulator system according to claim 4, wherein said signals AA and AB are input to a vertical gust circuit whose output may used when a flag ITRBGUST=1, or is not used when said flag ITRBGUST =0.

6. The simulator system according to claim 5, wherein said signals AD and AE are added to provide a blade angle of each blade relative to a direction of translation of the helicopter;

wherein the cosine of said blade angle is calculated and multiplied by $r_m$ (where $r_m = AC \times AG$) and also by AF, to generate array index INDX; and wherein INDX is simultaneously fed to an array ($W_A$) that holds the outputs of said Vertical Gusts circuit, and to two arrays ($W_R$, $W_L$,) that hold the turbulence values at said onset line.

7. The simulator system according to claim 6, wherein the sine of said blade angle is calculated and processed as follows to generate $P_{m,n}$:

$$P_{m,n}=\{\{[(\text{Sine of blade angle})*(r_m)]+[AG]\}\times 0.5\}+0.5.$$

8. The simulator system according to claim 7, wherein signals CB and CC are respectively fed from said body-turbulence circuit to said arrays $W_R$ and $W_L$; and wherein $P_{m,n}$ and the outputs of said arrays $W_R$ and $W_L$ are fed to a Gaussian Interpolation circuit whose output $OW_B$ is defined by the following equation:

$$OW_B = \frac{p_{m,n}w_R + (1-p_{m,n})w_L}{\sqrt{p_{m,n}^2 + (1-p_{m,n})^2}}$$

9. The simulator system according to claim 8, wherein the outputs of said array $W_A$ and said circuit $W_B$ are added to provide a total turbulence input to said blade-segment.

10. The simulator system according to claim 9, wherein said total turbulence input is determined for each one of said plurality of blade-segments.

11. The simulator system according to claim 10, wherein said signal AH corresponds to a velocity ($V_{HV}$) and is fed to a Patches of Turbulence circuit; and wherein signal AL may correspond either to the output of said a Patches of Turbulence circuit or to an input signal to said Patches of Turbulence circuit.

12. The simulator system according to claim 11, wherein said Patches of Turbulence circuit calculates a waiting time Tw according to the following equation:

$$Tw=Time-PTLSIG,$$

where PTLSIC represents the last time;

wherein if Tw is greater than a random wait time PTRNDW, said Patches of Turbulence circuit runs a first routine followed by a second routine, but if Tw does not exceed said random wait time PTRNDW, then said Patches of Turbulence circuit runs said second routine.

13. The simulator system according to claim 12, wherein a rotor-plane aerodynamic velocity Vuv is fed into a look up table for generating a corresponding time delay PLMBD, which is then fed into another look-up table for generating an output signal ramp up time PRMPT.

14. The simulator system according to claim 13, wherein said first routine further generates two output signals random time to wait (PTRNDW) and turbulence magnitude (PSIGNEW) according to the following equations:

$$PTRNDW=PLMBD\times \ln[0.85(U(0,1))+0.1]$$

$$PSIGNEW=abs(z(DISP*1.2533))$$

where U is a uniform random number, and z is a Gaussian random number.

15. The simulator system according to claim 14, wherein said second routine generates an output signal $\sigma_w$ that represents a turbulence RMS intensity.

16. The simulator system according to claim 15, wherein said Vertical Gusts of Turbulence circuit calculates said ating time Tw, and if Tw is found to be greater than said random wait time PTRNDW, said Vertical Gusts of Turbulence circuit runs a first Vertical Gusts of Turbulence routine followed by a second Vertical Gusts of Turbulence routine, but if Tw does not exceed said random wait time PTRNDW, then said Vertical Gusts of Turbulence circuit runs said second Vertical Gusts of Turbulence routine;

wherein a rotor-plane aerodynamic velocity Vuv is fed into a look up table for generating a corresponding delay time PLMBD, which is then fed into another look-up table for generating an output signal ramp-up time PRMPT;

wherein said first Vertical Gusts of Turbulence routine further generates two output signals time to wait (GTRNDW) and gust magnitude (GUSTNEW) according to the following equations:

$$GTRNDW=PLMBD\times \ln[0.85(U(0,1))+0.1]$$

$$GUSTNEW=z(GSIG),$$

where z is a Gaussian random number, and GSIG is standard derivation of turbulence; and wherein said second Vertical Gusts of Turbulence routine generates an output signal $\sigma_w$ that represents a turbulence RMS intensity.

17. A method for use in real-time piloted helicopter simulation, the helicopter having a center of gravity, a rotor disc, a rotor tail, and a plurality of blades, each of which including a plurality of blade-element stations, the method comprising the steps of:

applying finite element turbulence simulation to the rotor blades of the helicopter creating and propagating three translational components of turbulence in real time, and superposing turbulence velocity components at each blade element station as a function of helicopter velocity, with distribution according to each blade element instantaneous geometry;

defining an onset line for representing a line of turbulence along the rotor disc, said onset line being tangential to the rotor disc;

applying said turbulence velocity components at two points along said onset line;

periodically updating said turbulence velocity components and distributing the updated turbulence velocity components to the individual blade-segment stations; and using at least one array $W_K$, $W_M$ to correlate gusts entering the center of gravity and gusts entering the tail rotor, and for delaying the response of either the center of gravity or the tail rotor relative to each other, based on the velocity of the helicopter to provide a realistic response to gust conditions.

18. The method according to claim 17, wherein an input circuit generates a plurality of output signals (AA, AB, AC, AD, AE, AF, AG) that are fed to a body-turbulence circuit, and that generally correspond to, and are derived from the helicopter rotor geometry and dynamics parameters, simulator system variables, and turbulence variables.

19. The method according to claim 18, wherein said input circuit further generates a plurality of output signals (AH, AJ, AK, AL, AM, AN, AO, AP, AQ) that are fed to said blade-element turbulence circuit, and that generally correspond to, and are derived from the helicopter rotor geometry and dynamics parameters, simulator system variables, and turbulence variables.

20. A software implemented real-time piloted helicopter simulation, wherein the helicopter has a center of gravity, a rotor disc, a rotor tail, and a plurality of blades, each of which including a plurality of blade-element stations, the simulation comprising in combination:

a routine for applying finite element turbulence simulation to the rotor blades of the helicopter, for creating and propagating three translational components of turbulence in real time, and for superposing turbulence velocity components at each blade element station as a function of helicopter velocity, with distribution according to each blade element instantaneous geometry;

a simulated onset line representing a line of turbulence along the rotor disc, said onset line being tangential to the rotor disc, with said turbulence velocity components being applied at two points along said onset line;

said routine periodically updating said turbulence velocity components and distributing the updated turbulence velocity components to the individual blade-segment stations; and a routine for using at least one array $W_K$, $W_M$ to correlate gusts entering the center of gravity and gusts entering the tail rotor, and for delaying the response of either the center of gravity or the tail rotor relative to each other, based on the velocity of the helicopter to provide a realistic response to gust conditions.

* * * * *

UNITED STATES PATENT AND TRADEMARK OFFICE
CERTIFICATE OF CORRECTION

PATENT NO : 5,860,807
DATED : Jan. 19, 1999
INVENTOR(S): R.E. McFarland, Union City; Ken Dulsenberg, Roseville, both of Calif.

It is certified that error appears in the above-identified patent and that said Letters Patent is hereby corrected as shown below:

On the title page, item [75],

The last name of the above underlined inventor is misspelled. The correct spelling is Duisenberg.

Signed and Sealed this

Thirty-first Day of August, 1999

Attest:

Q. TODD DICKINSON

*Attesting Officer*   *Acting Commissioner of Patents and Trademarks*